United States Patent [19]

Hwang et al.

[11] Patent Number: 5,360,877
[45] Date of Patent: Nov. 1, 1994

[54] EPOXY INTERPENETRATING POLYMER NETWORKS HAVING INTERNETWORK CHEMICAL BONDS

[75] Inventors: Jyi-Faa Hwang, Bethlehem, Pa.; John P. Dismukes, Annandale, N.J.

[73] Assignee: Exxon Research and Engineering Company, Florham Park, N.J.

[21] Appl. No.: 61,395

[22] Filed: May 13, 1993

Related U.S. Application Data

[63] Continuation-in-part of Ser. No. 819,046, Jan. 10, 1992, abandoned.

[51] Int. Cl.$^5$ .................. G08G 59/22; C08L 63/00
[52] U.S. Cl. .................. 525/423; 528/27; 528/99; 528/100; 528/103; 528/109; 528/112; 528/113; 528/114; 528/115; 528/120; 528/124; 528/327; 528/361; 528/365; 528/407
[58] Field of Search .............. 525/523, 476, 524, 423, 525/525, 438, 526, 533, 903; 528/27, 99, 100, 103, 109, 112, 113, 114, 115, 120, 124, 327, 361, 365, 407

[56] References Cited

U.S. PATENT DOCUMENTS

| | | | |
|---|---|---|---|
| 4,302,553 | 11/1981 | Frisch et al. | 525/28 |
| 4,468,485 | 8/1984 | Gourdenne et al. | 523/137 |
| 4,594,291 | 6/1986 | Bertram et al. | 428/414 |
| 4,594,397 | 6/1986 | Goel et al. | 525/528 |
| 4,766,183 | 8/1988 | Ritzk et al. | 525/454 |
| 4,870,138 | 9/1989 | Wrezel | 525/391 |
| 4,957,981 | 9/1990 | Schutyser et al. | 525/529 |
| 4,996,101 | 2/1991 | Landis et al. | 428/272 |

FOREIGN PATENT DOCUMENTS

| | | |
|---|---|---|
| 311349 | 4/1989 | European Pat. Off. . |
| 0417837 | 2/1991 | European Pat. Off. . |
| 4021328 | 9/1992 | Germany . |

OTHER PUBLICATIONS

Journal of Polymer Science: Part B: Polymer Physics, vol. 28, 623–630, 783–794 (1990).
American Chemical Society, Advances in Chemistry Series 211, Aug. 26–31, 1984 (pp. 211–230).
Encyclopedia of Polymer Science, 2nd edition, vol. 6, Wiley, 1986.
Polymer Engineering and Science, vol. 19, p. 297 (1979).
Polymer Engineering and Science, vol. 14, p. 646 (1974).
Nasa Tech. Briefs, Jun. 1990, p. 64.
Chemical Abstracts, vol. 112, No. 1, 2 Jul. 1990.
Chemical Abstracts, vol. 107, No. 26, 28 Dec. 1987.
SAMPE Journal, vol. 24, No. 5, Sep./Oct. 1988 pp. 25–32.
Polymer Engineering and Science, vol. 31, No. 1 Mid Jan. 1991, pp. 28–33.
Polyimides: Materials Chemistry and Characterization, Elsevier Science Publishers B.V., Amsterdam, 1989, pp. 37–59.

*Primary Examiner*—Frederick Krass
*Attorney, Agent, or Firm*—Estelle C. Baklin

[57] ABSTRACT

Epoxy interpenetrating polymer networks having chemical bonds between the interpenetrating networks are prepared from a first and a second polymer network, at least one of which contains an EPRXE resin; a resin having two epoxide functionalities represented by E and a reactive pendant nonepoxide functionality X. The two resin networks are sequentially crosslinked followed by activation of the pendant functionality of the EPRXE resin to form internetwork chemical bonds between the two resin networks affording an epoxy resin with both increased strength and toughness. The invention is also directed to the process of making interpenetrating polymer networks.

9 Claims, No Drawings

EPOXY INTERPENETRATING POLYMER NETWORKS HAVING INTERNETWORK CHEMICAL BONDS

This is a Continuation-in-Part of copending U.S. Ser. No. 819,046 which was filed on Jan. 10, 1992, now abandoned.

BACKGROUND OF THE INVENTION

The present invention concerns Interpenetrating Polymer Networks (IPNs) containing an epoxy resin having two terminal epoxide groups and a third reactive non-epoxide group. Such IPNs have good tensile strength, fracture toughness, moisture resistance, and thermal stability and are suitable for use as structural material for hot/wet environments, especially for oil field applications.

Epoxy resins can be toughened with rubbers or thermoplastics, but each method has drawbacks. Rubber incorporation significantly improves the room temperature fracture toughness of brittle epoxies at the expense of strength, modulus, and thermal stability. The addition of thermoplastics results in a lesser degree of toughening than rubber modification, but affords better damage tolerance at an elevated temperature.

Currently, the potential methods for the simultaneous enhancement of strength and toughness, without sacrificing thermal stability, are: incorporation of rigid thermoplastic segments into thermosets; addition, via functionalization of pendant groups or addition of functionalized block or graft copolymers, of noncovalent intermolecular forces, for example, hydrogen or ionic bonding; and formation of IPNs for synergistic property advancement.

IPNs are known in the art as unique blends of crosslinked polymers containing essentially no covalent bonds, or grafts between them. [Adv. Chem. Ser., 211 (multicomponent Polymer Materials) Two-and Three Component Interpenetrating Polymer Networks, Klempner et al., Ch. 13, 1986.] A major problem encountered in their preparation is phase separation. The known thermodynamic immiscibility of polymers leads to a multiphase morphology upon normal mixing or blending, hence, leading to certain degrees of phase separation depending on the extent of miscibility.

The art of making an IPN relies on the ability to overcome the thermodynamic driving force for phase separation (i.e., when one of the components forms a discrete phase while the other forms a continuous phase). The occurrence of phase separation in IPNs leads to undesired structural inhomogeneity and defects, and consequently poor mechanical properties.

Conventional IPN technology avoids phase separation of constituent polymers by introducing physical entanglement between two polymers. This is done by polymerizing or crosslinking the two polymers sequentially or simultaneously. Sequential synthesis involves the swelling of polymer A with monomer B and a crosslinking agent; B is then polymerized and crosslinked. In simultaneous synthesis, monomers A and B are polymerized and crosslinked by noninterfering mechanisms. (Encyclopedia of Polymer Science and Engineering, 2nd edition, V. 8, 279, 1986.) The present invention alleviates phase separation and also forms internetwork bonds between two crosslinked networks.

Methods for increasing the toughness and strength, without sacrificing thermal stability, of polymers by IPN technology are known in the art. Normally, such IPNs consist of a rigid polymer network for strength, and a ductile, but high Tg, polymer for toughness. The Langley Research Center reported in "Tough, Microcracking-Resistant, High-Temperature Polymer," NASA Tech Briefs, June 1990, pg. 64, the simultaneous synthesis of a semi-IPN (i.e., one of the polymers is crosslinked while the other is not) polyimide consisting of a thermosetting polyimide and a thermoplastic polyimide. Toughness, resistance to microcracking, and glass transition temperature were all improved. Typically these new compositions are used in the aircraft/aerospace field and some are being considered for a variety of electrical and electronic applications.

U.S. Pat. No. 4,468,485 teaches the preparation of IPNs such as Epoxy/unsaturated polyester with one polymer (unsaturated polyester) crosslinked by radical reaction while the other (epoxy) is crosslinked by heat-activated polyaddition. No chemical bond exists between the two polymers.

ICI's EP 311,349 concerns thermoplastic polymer/thermoset polymer IPNs, for example, an amino-terminated polyarylsulfone (a thermoplastic) and an epoxy resin. In this case, the cocontinuous phase morphology, demonstrating the best mechanical properties, was obtained only at a certain range of composition ratio between the thermoplastic and thermoset polymers. Such an IPN resulted in a single glass transition temperature indicating molecular level miscibility. This is the case of a semi-IPN, since the thermoplastic phase itself does not form a network.

Akzo's EP 417,837 describes the formation of a "chemically-linked" epoxy/triallylcyanurate IPN, in which the triallylcyanurate is crosslinked by radical initiator while the epoxy is crosslinked by a curing agent that also contains a radical-crosslinkable double bond. Such curing agent al so serves as the chemical link between two polymers. Conventional IPNs have no chemical bonding between network polymers, rather, the polymers are physically entangled. One single Tg and good thermal stability was claimed. One aspect of the present invention uses diamine as the crosslinker, which is known to inhibit radical polymerization, and therefore precludes the use of free radical reactions to form chemical bonds between the two IPN networks.

Dow Chemical's U.S. Pat. No. 4,594,291, issued to Bertram et al., teaches the preparation of relatively high molecular weight epoxy resins by prereacting regular epoxy resins with a curing agent. Such an epoxy/curing agent mixture was shown to provide improved toughness and processability compared with mixing of the standard low molecular weight epoxy resin and a curing agent. One specific example disclosed is the use of sulfonic acid amide as the curing agent for prereaction. Such curing agent is exemplified by the formula

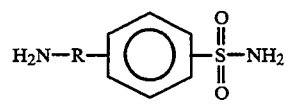

where R is a hydrocarbon group having from 1 to about 4 carbon atoms. Two active hydrogens on one of its amino end groups will link into part of the epoxy backbone while the other two, due to their relatively lower reactivity, are available for further reaction with epoxies at elevated temperature. Such a resin alone has a viscosity too high for conventional composite processing technology.

Epoxy IPNs containing a rubbery network are also known in the art. For example, Epoxy/butyl acrylate IPNs were synthesized at Lehigh University, Scarito and Sperling, Polymer Engineering and Science, 19, 297 (1979). The resulting IPN exhibits two phase morphology, improved toughness, but lower tensile strength. Glycidyl methacrylate, with one epoxy and one polymerizable acrylate, was added to form chemical grafts between epoxy and butyl acrylate networks. The appearance of two Tgs and phase separation indicates that the formation of chemical grafts by radical copolymerization with a bifunctional comonomer is not sufficient to suppress phase separation between two polymers.

Epoxy/PU graft-IPNs were prepared by Frisch et al. [H.L. Frisch, K.C. Frisch and D. Klempner, Polym. Eng. Sci., 14, 646 (1974)], using excess isocynates, the chain extender for PU, to form covalent links with the pendant hydroxyl groups of epoxy polymers. The resulting material had improved tensile strength and elongation (232%) and showed one glass transition temperature at about 70° C. However, such a material is too flexible for structural applications.

The limitations of current epoxy polymers as the matrix in polymer composites for use as structural materials in corrosive oil field applications are known. Oil field pipes require long-term resistance to medium pressure $CO_2$ and $H_2S$ gases (ca. 150 psi) and 5% salt water at 150° F. This obviates the need for reversible tensile behavior or a composite yield strength of about 55 ksi. Existing polymer composites fail to meet the 55 ksi requirement because they exhibit weeping failure {the diffusion of fluid molecules through the thickness of the pipe) due to yielding below 20 ksi. This weeping failure is preceded by matrix microcracking, which in turn is attributable to insufficient matrix toughness. The present invention overcomes these limitations by improving matrix toughness.

SUMMARY OF THE INVENTION

The present invention is an interpenetrating polymer network and the process of making it. An EPRXE resin is a diepoxy resin of a patticular type as noted herein.

The present invention is directed to an interpenetrating polymer network comprising a first and a second polymer network at least one of which contains an EPRXE resin, and having internetwork chemical bonds between said first and said second networks, wherein said first polymer network is comprised of a crosslinker and an EPRXE resin (a diepoxy resin) selected from the group consisting of:

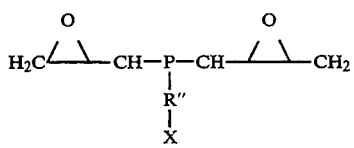

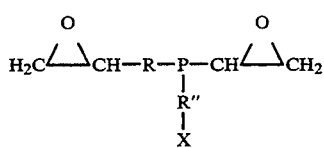

-continued
and

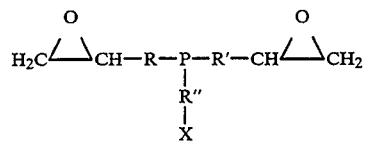

and wherein X is a pendant non-epoxide functionality anchored on the backbone of said EPRXE resin through carbon or nitrogen atoms represented by P, and spacer groups, R, R', and R", where R, R', and R" are selected from the group consisting of aliphatic, aromatic and combinations of aliphatic and aromatic hydrocarbons and wherein X is selected from the group consisting of primary, secondary, and tertiary amino, protected amino, and protected carboxyl groups, and wherein said second polymer network is comprised of a crosslinker and a diepoxy resin selected from the group consisting of said EPRXE resin of said first polymer network and

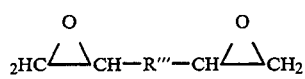

wherein R''' is selected from the group consisting of saturated, unsaturated, and aromatic hydrocarbons and oxygen containing groups wherein R''' is selected from the group consisting of saturated; unsaturated, and aromatic hydrocarbons and oxygen containing groups wherein said oxygen of said oxygen containing groups is in the form of ether linkages, and mixtures thereof.

The invention is further directed to a process of making an interpenetration polymer network comprising a first and a second polymer network at least one of which contains an EPRXE resin, and having both increased strength and toughness comprising the steps of:

(a) combining, to form a first mixture, a first crosslinker (C1) with an EPRXE resin (E1) wherein said crosslinker (C1) has a reactivity at least about 5 times higher than said X group of said EPRXE resin (E1) and wherein said EPRXE resin (E1) has a molecular weight between about 325 and about 6000 and wherein said EPRXE resin (E1) is selected from the group consisting of

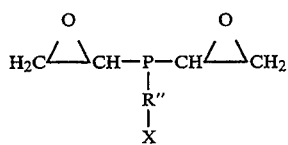

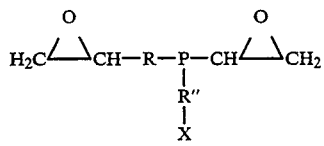

and

-continued

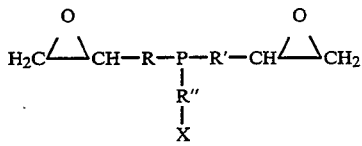

and wherein X is a pendant non-epoxide functionality anchored on the backbone of said EPRXE resin through carbon or nitrogen atoms represented by P, and spacer groups, R, R', and R", where R, R', and R" are selected from the group consisting of aliphatic, aromatic and combinations of aliphatic and aromatic hydrocarbons and wherein X is selected from the group consisting of primary, secondary, and tertiary amino, protected amino and protected carboxyl groups;

(b) crosslinking said first mixture without reaching gelation to form a first polymer network;

(c) combining, to form a second mixture, a diepoxy resin (E2) with a crosslinker (C2) wherein said diepoxy resin (E2) has a molecular weight between about 325 and about 6000 and wherein said diepoxy resin (E2) is selected from the group consisting of said EPRXE resins (E1) of step (a) and

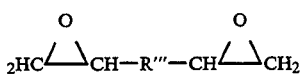

wherein R''' is selected from the group consisting of saturated, unsaturated, and aromatic hydrocarbons and oxygen containing groups wherein said oxygen of said oxygen containing groups is in the form of ether linkages, and mixtures thereof, and wherein when said diepoxy resin (E2) is an EPRXE resin said crosslinker (C2) has a reactivity at least about 5 times higher than said X group of said EPRXE resin;

(d) crosslinking without reaching gelation said second mixture to form a second polymer network;

(e) mixing said first and said second polymer networks to form a polymer mixture;

(f) curing said polymer mixture under a multistage temperature schedule, wherein said multistage temperature schedule is capable of gelling said resin mixture and forming the interpenetrating polymer network without reacting said X group(s), and when said X group(s) is a protected amino or a protected carboxyl group, an unprotecting agent is added to the polymer mixture, and thereafter increasing the temperature of said multistage temperature schedule to activate said X group(s) of said EPRXE resin(s) to form internetwork chemical bonds between said first and said second polymer networks.

As used herein pendant means that the group is a branched group, branching off of the P group of the EPRXE resin.

The IPNs of the present invention can be used in the oil field industry as a polymer composite for oil field pipes.

DETAILED DESCRIPTION OF THE INVENTION

This invention utilizes EPRXE resins, where E is an epoxide functionality and X is a reactive non-epoxide pendant functionality, to prepare IPNs wherein an internetwork, chemical bond is established through the "X" functionality by forming covalent or ionic bonds between the two network polymers that interpenetrate each other. Such internetwork bonds are not present in conventional IPN linkages, where only entanglement between the two networks is found. The added bonding of the present invention may be responsible for the prevention of phase separation encountered with conventional epoxies. The pendant X functionality of the EPRXE resin can be selected from the groups primary ($-NH_2$), secondary ($-NHR$) and tertiary ($-NR_2$) amines, chemically protected amino and chemically protected carboxyl groups.

The IPNs of the present invention comprise a first polymer network made by combining a crosslinker (C1) with an EPRXE resin (E1) to form a first polymer network (N1) wherein (C1) has a reactivity at least about five times higher than that of the nonepoxy functionality of the EPRXE resin being utilized. Generally, the EPRXE resin (E1) will have a molecular weight of about 325 to about 6000. The first polymer network is thereafter sequentially crosslinked with a second polymer network (N2). The two polymer networks are initially prestaged, or crosslinked, separately without reaching gelation, and are then mixed. The second polymer network is prepared by prestaging a crosslinker (C2) which may be the same crosslinker (C1) or another crosslinker and a diepoxy resin (E2) having a molecular weight of about 325–6000. The diepoxy resin (E2) may be, but needn't be, an EPRXE resin. If (E2) is an EPRXE resin, (E2) may be the same resin as (E1) or another EPRXE resin. When (E2) is also an EPRXE resin, C2 must have a reactivity at least about five times higher than that of the nonepoxy functionality of the EPRXE resin (E2) being utilized. When the X group is primary, secondary or tertiary amine, the first and second polymer networks are mixed and cured under a multistage temperature schedule capable of gelling the IPN at a lower temperature than required to activate the pendant X group of the EPRXE resin(s) followed by increasing the temperature to activate the pendant X group of the EPRXE resin forming the internetwork link and completing the cure. Such a multistage temperature cure would be selected according to the EPRXE resin(s) chosen and would be readily determinable by those skilled in the art. When the X group of the EPRXE(s) resin is a chemically protected carboxyl, or chemically protected amino group, activation of the X group is accomplished by adding a catalyst, after the mixing of the two prestaged polymer networks, to unprotect the group. The unprotected pendant functionality, being less reactive than the crosslinking agent, is then activated at elevated temperatures of at least about 120° C. to form an internetwork link. The activation temperature should not exceed the degradation temperature of the system which is about 250° C. $+/-50°$ C.

During a synthesis when one wishes to carry out a reaction with one functional group on a molecule with a reagent which would also react with another functional group on the same molecule, one of the groups is temporarily "protected" by coverting it into another functional group that is unreactive to the reagent in question. Nonlimiting examples of both protected carboxyl and protected amino groups are illustrated in the specification (pp. 16–17) and one skilled in the art would be able to easily determine other such protective groups. Hence in applicants' invention, the protective groups are less reactive than the crosslinking agent employed and allow the crosslinking agent to react prior to the reaction of the X group of the EPRXE resin. Following reaction of the crosslinking agent, the protected group must be unprotected to allow it to react. To accomplish this, an unprotecting agent is added to convert the protected group to e.g. amino or carboxyl. Upon increasing the multistage temperature schedule, the unprotecting agent unprotects the protected group allowing it to react or become activated. Activation may also be necessary when groups are not chemically protected but need more severe conditions such as higher temperature, to participate in the reaction. Activation merely refers to the conditions necessary for allowing a group to take part in the reaction. The unprotecting agent would be selected based on the protecting group. Such selection and terminology is clear to one skilled in the art.

The IPNs of the present invention formed by utilizing an EPRXE resin with a pendant primary, secondary, or tertiary amine group may be prepared by dispersing into the EPRXE resin a diamine crosslinker with a reactivity at least about 5 times greater than that of the pendant amine group of the EPRXE resin and prestaging, i.e., crosslinking without reaching gelation. Simultaneously, in a different resin kettle, diamine crosslinker is dissolved in a diepoxy resin (E2), for example, DER 331, EPON 828, or their homologs, followed by prestaging, crosslinking without reaching the gelation stage. The diepoxy resin and EPRXE resin selected will have a molecular weight of about 325 to about 6000, preferably about 350 to about 2000, and more preferably about 350 to about 1000. The two resin mixtures are then mixed and cured under a multistage temperature schedule to initially crosslink the two resin networks at a lower temperature than required to activate the pendant X group of the EPRXE resin, followed by increasing the temperature to activate the pendant X group of the EPRXE resin to form internetwork links (chemical bonds) between the two networks. It is known in the art that the time and temperature suitable for crosslinking the two resin networks depends on the type of resins, curing agents, and their composition ratio. The gel time for each resin/crosslinker mixture should be determined separately before prestaging and final mixing. Gel time is generally determined by measuring the increase of viscosity as a function of crosslinking time at a given temperature. It is recommended that the prestaging temperature should not exceed 150° C., and the time to gel at prestaging temperature, after prestaging, should be at least about 30 minutes to allow enough time for further mixing and degassing. It is also recommended that the final mixture be allowed to gel initially at a temperature no higher than 150° C. before continuing with further cure.

Likely the formation of a unique 3 dimensional architecture, for example, an IPN with an internetwork link, provides a toughening mechanism by increasing the internal friction between the two networks.

The major toughening mechanism is likely the multiple cracking observed on the fracture surfaces of both tensile (ASTM 0638) and impact specimens (ASTM 0256) probably attributed to the formation of IPN morphology.

The crosslinkers which can be used in preparing IPNs when using an EPRXE resin with a pendant, primary, secondary, and tertiary amine, and protected amino groups are diamine crosslinkers having the general formula as:

$H_2N-Z-Y-NH_2$ or $H_2N-Z-Y-Z'-NH_2$ or $H_2N-Z-NH_2$ where Z and Z' are aromatic, or cyclic aliphatic hydrocarbons which may contain substituents on the ring structures selected from the groups $-CH_3$, F, Cl, and Br. Y may be sulfone or methylene. Preferably the diamine crosslinker is diaminodiphenyl sulfone.

The diepoxy resins (E2), other than EPRXE resins, which can be used in the present invention have the general formula:

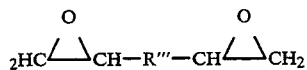

where R''' may be any saturated, unsaturated, or aromatic group as well as groups containing oxygen in the form of ether linkages, and mixtures thereof. Representative of useful diepoxy compounds are the following:

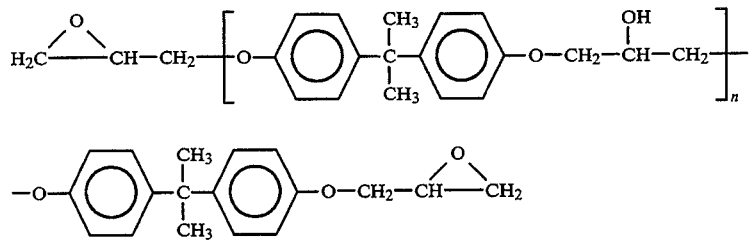

Typical liquid diepoxy resins which can be used have n values of zero to one, whereas solid grade resins which can be used have n>2.5. n may be as high as eighteen. Commercially available diepoxy resins which may be used are DER 332 (diglycidal ether of Bisphenol A) available from Dow Chemical and EPON 825 available from Shell Chemical, both having "n" close to zero; DER 331, also available from Dow Chemical, and EPON 828, available from Shell Chemical, both having "n" of about 0.15. Preferably the diepoxy resin is a DGEBA type resin having a molecular weight of between about 325 and about 6000.

The IPNs of the present invention utilizing EPRXE resins with a chemically protected amino group as the pendant X functionality of the EPRXE resin, for example, in the form of 2-trimethylsilylethyl carbamate $RNCOOCH_2Si(CH_3)_3$, can be prepared by prestaging the EPRXE resin with a stoichiometric amount of a diamine crosslinking agent, for example diaminodiphenyl sulfone and about 1 part per hundred (phr) of $BF_3$-monoethylamine as an accelerator at about 80° to about 100° C.

Simultaneously in a second reactor a diepoxy resin and a stoichiometric amount of the same or another aromatic or cyclic aliphatic diamine crosslinking agent, plus about 1 to about 5 Wt%, based on the amount of EPRXE resin in the first polymer network, of trifluoroacetic acid is added to unprotect the amino functionality of the EPRXE resin.

The resin mixtures are then mixed and degassed under vacuum. The resulting material is then cured for about 2hrs at about 150° C. and 4hrs at about 177° C. Post cure at a temperature of about 200° C. for about an hour may be required to complete the cure.

The IPNs of the present invention utilizing a pendant protected carboxyl functionality as the X group of the EPRXE resin, for example, in the form of a t-butyl ester, can be prepared by prestaging the EPRXE resin with a stoichiometric amount of anhydride curing agent such as hexahydro phthalic anhydride, and about 1 phr of triphenyl phosphine at about 80° to about 100° C.

Simultaneously in a second reactor a diepoxy resin and a stoichiometric amount of the same or similar (having a melting temperature within about $+/-50°$ C.) anhydride crosslinking agent plus about 1 to about 5 Wt%, based on the EPRXE resin, of trifluoroacetic acid is added to unprotect the carboxyl functionality of the EPRXE resin.

The resin mixtures are then mixed and degassed under vacuum. The resulting material is then cured for about 2hrs at about 90° to about 120° C., and about 2hrs to about 4hrs, at about 150° to about 180° C.

The anhydride crosslinking agents which may be used in the present invention are commonly used crosslinking agents such as phthalic anhydride, hexahydrophthalic anhydride (HHPA), nadic methyl anhydride, tetrahydro phthalic anhydride and other commonly used anhydrides. Preferably a saturated anhydride such as HHPA will be used.

IPNs can also be prepared from two polymer networks each containing EPRXE resins having protected pendant carboxyl groups. Each resin is separately prestaged with an anhydride crosslinking agent. The two resins are then mixed and about I to about 5 weight percent of an unprotecting agent such as trifluoroacetic acid and about 1 to about 5 weight percent of a metallic salt, e.g. Zinc acetate, Manganese acetate, or Lithium acetate is added. After curing at an elevated temperature of about 160° to about 200° C., the metallic salt probably induces ionic association between neighboring carboxyl groups. The ionic association provides the internetwork bond or link between the two interpenetrating networks.

Similarly, the invention can be carried out using an EPRXE resin in each of the two networks wherein the X groups of the EPRXE resins are not the same.

The EPRXE resins of the present invention can be prepared as follows:

EPRXE resins with a protected amino group can be prepared by reacting a 2-trimethyl silylethyl chloroformate-end capped amino dicarboxylic acid, e.g. 5(aminomethyl)-4-(carboxymethyl)-1H-pyrrole-3-propanoic acid, with diepoxides. The protecting group for the amino functionality can be unprotected by adding a small amount of trifluoroacetic acid, about 1 to about 5 wt. %.

EPRXE resins having an amino group at least about 5 times less reactive than those of the diamine crosslinking agent can be prepared by reacting an excess amount, about a 2:1 molar ratio, of diepoxies with a structurally asymmetric diamine having a reactive primary amine on one end and a less reactive secondary or tertiary amine, or an amide on the other end.

EPRXE resins with a protected carboxyl group can be prepared by base catalyzed reactions of diepoxies with the amino group of an amino acid , e.g. 4-aminophenyl acetic acid, of which the carboxyl group is protected by the formation of an ester.

Representative of EPRXE resins with a protected amino pendant functionality is:

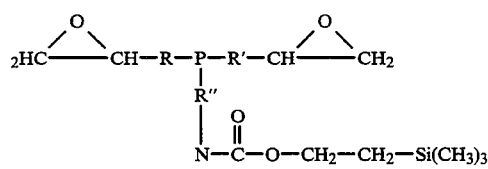

Representative of an EPRXE resin with a less reactive amino group is:

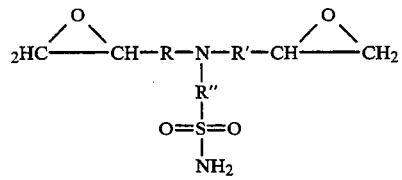

Representative of an EPRXE resin with a protected carboxyl group is:

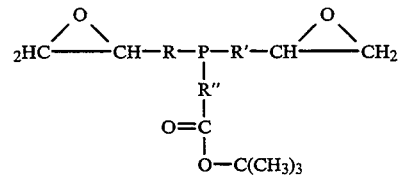

Some EPRXE resins may be purchased commercially. For example TACTIX 695 available from Dow Chemical (see U.S. Pat. No. 4,594,291),

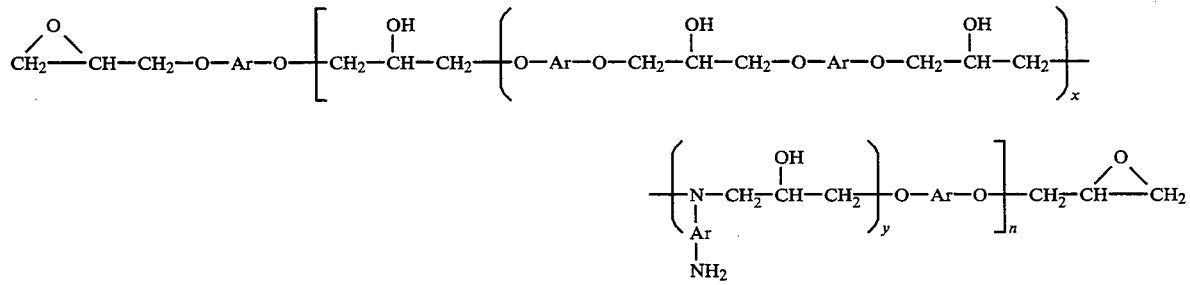

wherein AR=phenyl or partially substituted phenyl (1-4 BR substitutions). Similar EPRXE resins having X=0-5, preferably 1-2, Y=1-5, preferably 1 and n=1-3, preferably 1 may also be used.

Additional EPRXE resins are known in the literature for example: N,N,-bis(2,3-epoxypropyl)-Benzidine where X in the EPRXE resin is $NH_2$, R" is diphenyl, and P is N,

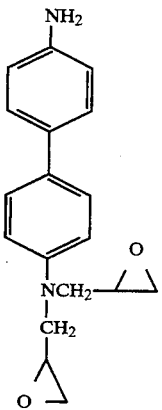

3-[bis(oxiranylmethyl)amino]-benzoic acid where X=$CO_2H$, R"=phenyl, and P=N,

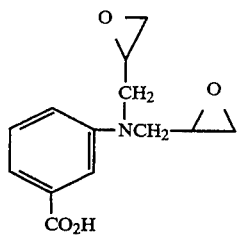

and 2,2-bis[(oxiranylmethoxy)methyl]-1,3-propanediamine where X =$NH_2$, R"=$CH_2$, and P=C.

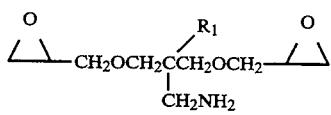

$R_1$ =aliphalic, aromatic, and combination aliphatic and aromatic or hydrogen.

EXAMPLE 1 - IPN 1

An IPN is prepared by using Dow Chemical Company's TACTIX 695 as the EPRXE resin according to the following procedure:

1. Under nitrogen sweep and mechanical stirring, dissolve phr of diaminodiphenyl sulfone (DDS) into 100 phr of DER332 preheated to 90° C. Add 1 phr of BF3-ethylamine, heat the mixture to 130° C. and let it react for 30–40 minutes or until there is clear indication of viscosity increase.
2. Simultaneously, in a different resin kettle, preheat 100 phr of TACTIX 695° to 130° C. and then stir in 9.5 phr of DDS (preheated to 130° C.). Continue the stirring for 10 to 15 minutes after DDS is well dispersed-indicated by the clear out of the mixture.
3. Pour mixture 1 into 2 carefully to minimize the entrapment of air. Mix mechanically for 5-10 minutes at 90° C. Degas the mixture under vacuum at 90° C.
4. Transfer the degassed mixture to a 150° C. preheated mold with release agent. Cure two hours at 150° C. plus four hours at 177° C., then let cool freely to room temperature inside the oven.

EXAMPLE 2 - IPN 2

An IPN is prepared by using Dow Chemical Companys TACTIX as the EPRXE resin according to the following procedure:

1. Under nitrogen sweep and mechanical stirring, dissolve 7.6 phr of diaminodiphenyl sulfone (DDS) into 100 phr of TACTIX 695 preheated to 90° C. Heat the mixture to 130° C. and let it react for 10-15 minutes or until there is clear indication of viscosity increase.
2. Simultaneously, in a different resin kettle, preheat 100 phr of DER332 to 90° C. and then stir in 40 phr of DDS (preheated to 130° C.) and about 1 phr of BF3-ethylamine. Continue the stirring for 10 to 15 minutes after DDS is well-dispersed-indicated by the clear out of the mixture.
3. Pour mixture 2 into 1 carefully to avoid the entrapment of air. Mix mechanically for 5-10 minutes at 90° C. Degas the mixture under vacuum at 90° C.
4. Transfer the degassed mixture to a 150° C. preheated mold with release agent. Cure two hours at 150° C. plus four hours at 177° C., then let cool freely to room temperature inside the oven.

Table I shows the mechanical properties of IPN-l and IPN-2 from examples 1 and 2 respectively, compared with pure DER 332/DDS epoxy polymer. Simultaneous improvement in tensile strength, impact toughness and fracture toughness was demonstrated.

TABLE I

| | Tensile Strength (MPa) | Fracture Toughness (MPa/m½) | Impact Strength (Joules/m) | Tg (°C.) |
|---|---|---|---|---|
| IPN-1 | 91 | 1.93 | 650 | 187 |
| IPN-2 | — | 1.48 | — | 189 |
| DER332/DDS | 70 | 1.09 | 280 | 240 |

What is claimed is:

1. A method for preparing an interpenetrating polymer network having internetwork chemical bonds comprising a first and a second polymer network at least one of which contains an EPRXE resin, and having both increased strength and toughness comprising the steps of:

(a) combining, to form a first mixture, a first crosslinker (C1) with an EPRXE resin (E1) having an X group wherein said crosslinker (C1) has a reactivity at least about 5 times higher than said X group of said EPRXE resin (E1) and wherein said EPRXE resin (E1) has a molecular weight between about 325 and about 6000 and wherein said EPRXE resin (E1) is selected from the group consisting of

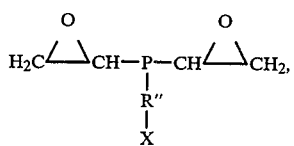

-continued

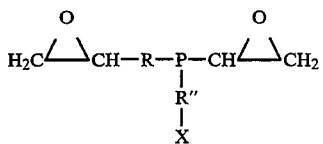

and

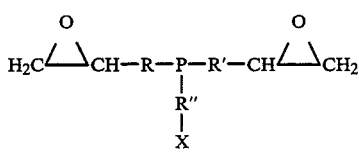

and wherein X is a pendant non-epoxide functionality anchored on the backbone of said EPRXE resin through carbon or nitrogen atoms represented by P, and spacer groups, R, R', and R'', where R, R', and R'' are selected from the group consisting of aliphatic, aromatic and combinations of aliphatic and aromatic hydrocarbons and wherein X is selected from the group consisting of primary, secondary, and tertiary amino, protected amino and protected carboxyl groups;

(b) crosslinking said first mixture without reaching gelation to form a first polymer network;

(c) combining, to form a second mixture, a diepoxy resin (E2) with a crosslinker (C2) wherein said diepoxy resin (E2) has a molecular weight between about 325 and about 6000 and wherein said diepoxy resin (E2) is selected from the group consisting of said EPRXE resins (E1) of step (a) and

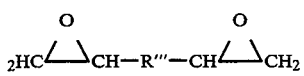

wherein R''' is selected from the group consisting of saturated, unsaturated, and aromatic hydrocarbons and oxygen containing groups wherein said oxygen of said oxygen containing groups is in the form of ether linkages, and mixtures thereof, and wherein when said diepoxy resin (E2) is an EPRXE resin said crosslinker (C2) has a reactivity at least about 5 times higher than said X group of said EPRXE resin;

(d) crosslinking without reaching gelation said second mixture to form a second polymer network;

(e) mixing said first and said second polymer networks to form a polymer mixture;

(f) curing said polymer mixture under a multistage temperature schedule, wherein said multistage temperature schedule is capable of gelling said polymer mixture and forming the interpenetrating polymer network without reacting said X group(s), and when said X group(s) is a protected amino or a protected carboxyl group, an unprotecting agent is added to the polymer mixture, and thereafter increasing the temperature of said multistage temperature schedule to activate said X group(s) of said EPRXE resin(s) to form internetwork chemical bonds between said first and said second polymer networks.

2. A method according to claim 1 wherein when said X group of said EPRXE resin (E1) is selected from the group consisting of primary, secondary, tertiary amino, and protected amino, said crosslinkers C1 and C2 are diamine crosslinkers.

3. A method according to claim 2 wherein said diamine crosslinkers (C1) and (C2) are selected from the group consisting of $H_2N-Z-Y-Z'-NH_2$, $H_2N-Z-Y-NH_2$ and $H_2N-Z-NH_2$ and wherein Z and Z' are aromatic or cyclic aliphatic hydrocarbons containing a ring structure which may contain substituents selected from the group consisting of -$CH_3$, Cl, F, and Br, and wherein Y is selected from the group consisting of sulfone and methylene.

4. A method according to claim 3 wherein said diamine crosslinkers are diaminodiphenyl sulfone.

5. A method according to claim 1 wherein R''' is

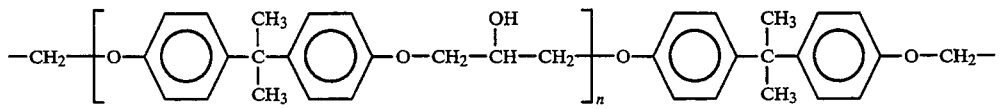

wherein n is from 0 to 18.

6. A method according to claim 1 wherein when said X group of said EPRXE resin(s) is a protected carboxyl group, said first and said second crosslinkers are anhydride crosslinkers.

7. A method according to claim 6 wherein said anhydride crosslinkers are selected from the group consisting of hexahydrophthalic anhydride, phthalic anhydride, tetrahydrophthalic anhydride, and nadic methyl anhydride.

8. A method according to claim 1 wherein when said first and said second polymer network each contain EPRXE resins with protected carboxyl groups as said X group, said crosslinkers (C1) and (C2) are anhydride crosslinkers and said internetwork chemical bond is an ionic bond.

9. A method according to claim 1 wherein said crosslinkers (C1) and (C2) are diaminodiphenyl sulfone, said diepoxy resin (E2) is diglycidyl ether of Bisphenol A, and said EPRXE resin (E1) has the general formula

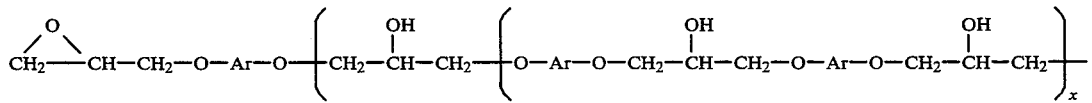

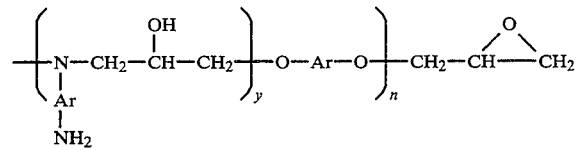
wherein X in the above formula is about 0 to about 5, y in the above formula is about 1 to about 5, n in the above formula is about 1 to about 3, and Ar is selected from the group consisting of phenyl and phenyl substituted with 1 to 4 bromine atoms.
* * * * *

UNITED STATES PATENT AND TRADEMARK OFFICE
CERTIFICATE OF CORRECTION

PATENT NO. : 5,360,877

DATED : November 1, 1994

INVENTOR(S) : Hwang et al

It is certified that error appears in the above-identified patent and that said Letters Patent is hereby corrected as shown below:

On the title page, attorney, agent or firm, "Baklin" should read --Bakun--.

Signed and Sealed this

Eighteenth Day of April, 1995

Attest:

BRUCE LEHMAN

Attesting Officer

Commissioner of Patents and Trademarks